United States Patent [19]

Sage et al.

[11] 4,266,732
[45] May 12, 1981

[54] VARIABLE REACTANCE ALIGNMENT DETECTOR AND CONTROL

[76] Inventors: David M. Sage; George E. Sage, both of 22002 Fall City Rd., Redmond, Wash. 98052

[21] Appl. No.: 151,166

[22] Filed: May 19, 1980

Related U.S. Application Data

[63] Continuation of Ser. No. 893,345, Apr. 4, 1978, abandoned.

[51] Int. Cl.³ .................. B05B 3/00; H01F 21/06; G08C 25/00
[52] U.S. Cl. .................................. 239/720; 239/721; 336/134; 340/870.33
[58] Field of Search ................ 239/177, 212; 336/134, 336/132; 340/199, 196, 195

[56] References Cited

U.S. PATENT DOCUMENTS

| | | | |
|---|---|---|---|
| 3,060,370 | 10/1962 | Varterasian | 336/134 |
| 3,140,450 | 7/1964 | Tavis | 331/340 |
| 3,738,687 | 6/1973 | Zimmer et al. | 137/344 |
| 3,952,769 | 4/1976 | Ott | 137/344 |
| 4,034,778 | 7/1977 | Sage et al. | |
| 4,073,309 | 2/1978 | Fraser et al. | 239/177 X |

*Primary Examiner*—Martin P. Schwadron
*Assistant Examiner*—A. Michael Chambers
*Attorney, Agent, or Firm*—David H. Deits; Roy E. Mattern, Jr.; Gregory W. Moravan

[57] ABSTRACT

An alignment system with a variable reactance element is provided for detection of the angular alignment of two variably positionable members. The variable reactance elements form two oppositely varying impedances. A preferred embodiment of the variable reactance element consists of a pair of inductive coils mounted on a core element which forms a flux path for each coil. The core has an integral, deflectable central member which forms a common flux path for both coils. Air gaps within the flux path of each coil are located on either side of the central member of the core. Another variable reactance consists of a first inductive coil having a fixed core element forming a partial flux path for the inductive coil and a movable core element positionable relative to the fixed core element with air gaps between the core elements. A second inductive coil having a similar associated core element is placed opposite the movable core element from the first coil element. A modification of the previous embodiment is disclosed wherein the fixed core elements are in part formed of spaced, elongated bars. Another version comprises a first conductive element and a second conductive element positioned near the first conductive element to form a variable capacitor. A third conductive plate opposite the second plate from the first plate but mechanically linked to the first plate forms a second variable capacitor which varies oppositely to the first capacitance. In a modification of the previous embodiment the first and third elements are formed by elongated bars. In another version there are two spaced conductive elements mechanically linked together, a third conductive element spaced opposite the first two elements and a fourth and fifth conductive element mechanically linked to the first pair of elements so that the two oppositely variable capacitors are formed. In a variation of the previous embodiment the four linked elements are formed of elongated bars. Detection circuitry utilizing comparators in one version and differential current relays in another are disclosed.

10 Claims, 29 Drawing Figures

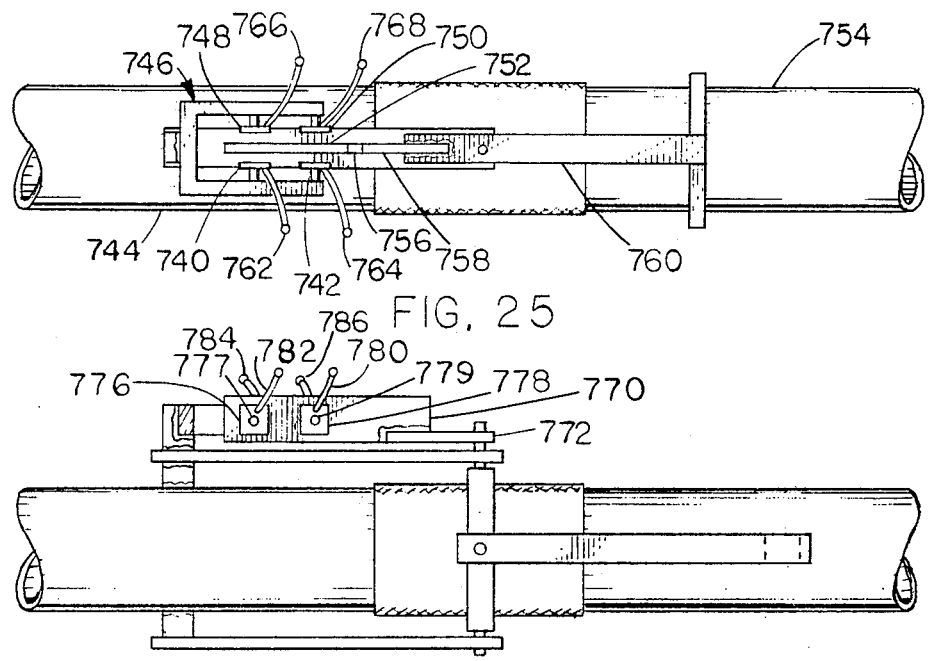
FIG. 25
FIG. 26
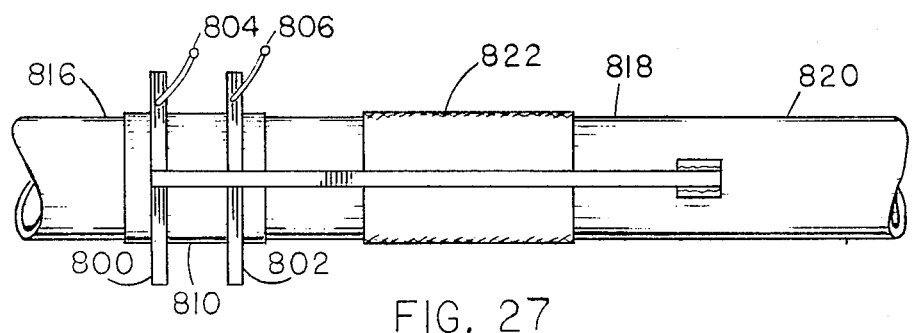
FIG. 27
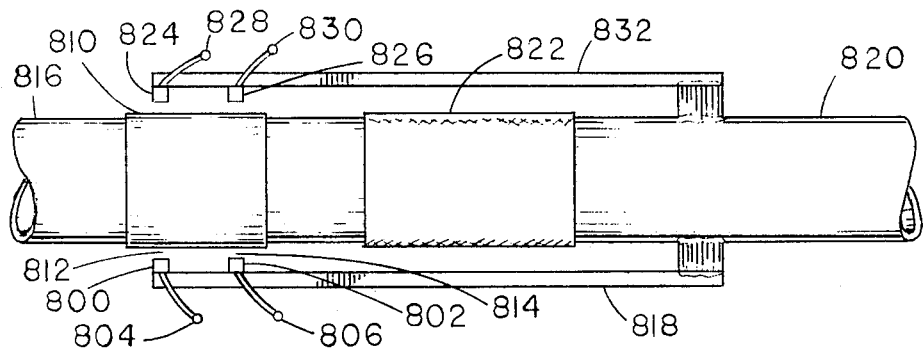
FIG. 28

4,266,732

VARIABLE REACTANCE ALIGNMENT DETECTOR AND CONTROL

RELATED APPLICATION

This application is a continuation of U.S. patent application Ser. No. 893,345, filed Apr. 4, 1978, now abandoned.

BACKGROUND OF THE INVENTION

1. Field of The Invention

The invention relates to variable reactance sensors and detection circuitry for use with the sensors to detect the alignment or misalignment of two members. A particularly advantageous application is use in controlling the alignment in mobile irrigation systems of the type having a plurality of independently driven, articulating sections which rotate about a central terminus.

2. Description of the Prior Art

Variable reactance sensors are illustrated in several U.S. Patents; for example, U.S. Pat. No. 2,269,453, E. L. Gaybart; Pat. No. 3,311,905, J. V. Johnston; and U.S. Pat. No. 3,140,450, J. R. Travis. Previously developed alignment control systems for traveling irrigation systems are illustrated in several U.S. Patents; namely, U.S. Pat. No. 2,711,615, N. R. Boice, Jr; U.S. Pat. No. 3,587,763, A. Kinkead; U.S. Pat. No. 3,823,730, J. W. Sandstrom et al.; and U.S. Pat. No. 4,034,778, D. E. Sage et al.

SUMMARY OF THE INVENTION

An alignment system with a variable reactance element is provided along with circuitry for detection of the angular alignment of two variably positionable members. The variable reactance element is in the form of two oppositely variable impedances. A preferred embodiment of the variable reactance element consists of a pair of inductive coils mounted on a core element which forms a flux path for each coil. The core has a base and an integral, deflectable central member which form a common flux path for both coils. Air gaps within the flux path of each coil are located on either side of the central member of the core. The core is linked by its base and central member between the two variably positionable members for movement therewith in order to oppositely vary the reactance of the coils. Another variable reactance consists of a first inductive coil having a fixed core element forming a partial flux path for the inductive coil and a moveable core element variably positionable relative to the fixed core element defining air gaps between the core elements which forms a complete flux path for the coil. A second inductive coil, having a similarly associated fixed core element which forms a partial flux path for the second coil, is placed opposite the moveable core element from the first core element to define variable sized air gaps and complete the flux path for the second coil. The moveable core is attached to one of the variably positionable members and the fixed cores are attached to the other for movement therewith to oppositely vary the inductance of the coils. A modification of the previous embodiment is provided in which the ends of the fixed core elements on either side of the coils are in the form of spaced elongated bars. Another version on the variable reactance element comprises a first conductive plate linked to one of the variably positionable members and a second conductive plate positioned near the first plate, and attached to the other variably positionable member to form a variable capacitor. A third conductive plate, attached to the same member as the first plate, forms a second variable capacitor which varies oppositely to the first capacitance. In a modification of the previous embodiment the first and third plates are formed by elongated bars. In another version of the variable reactance element there is a first plate attached to one of the variably positionable members. A second and third plate are spaced from each other, attached to the other variably positionable member, and positioned near the first plate to form a variable capacitor between the second and third plates. A fourth and fifth plate are spaced from each other, attached to the same variably positionable member as the second and third plate to form an oppositely variable capacitor between the forth and fifth plates. In a variation of the previous embodiment the four plates connected to the same member are formed of elongated bars. A mounting structure for use with an irrigation apparatus having internal type pivot connections between sections utilizes a support arm attached to one section which supports a sensor arm connected by a position detection member in the form of a fork to the adjacent section to actuate the sensors. A mounting structure for use with an irrigation apparatus having universal type pivot connections between sections utilizes a stinger attached to a pivot pin connected to the floating link of the universal joint to actuate the sensors. Detection of the changed in the reactance are detected by comparators which monitor a bridge network which includes the variable reactances. Another detection circuit uses a differential current relay with two coils each of which are in series with one of the oppositely variable reactances.

BRIEF DESCRIPTION OF THE DRAWINGS

FIG. 25 is a top plan view illustrating a mounting for the sixth embodiment of the alignment sensor on an irrigation apparatus having sections connected by internal type pivot connections which is structurally similar to the embodiment illustrated in FIG. 20.

FIG. 26 is a side elevation view illustrating a mounting for the sixth embodiment of the alignment sensor on an irrigation apparatus having sections connected by universal type pivot connections which is structurally similar to the embodiment illustrated in FIG. 21 with the nearest part of the element support structures broken away to show details.

FIG. 27 is a side elevation view illustrating a seventh embodiment of the alignment sensor.

FIG. 28 is a top plan view of the embodiment shown in FIG. 27.

DETAILED DESCRIPTION OF THE INVENTION

Introduction

Figure 1:
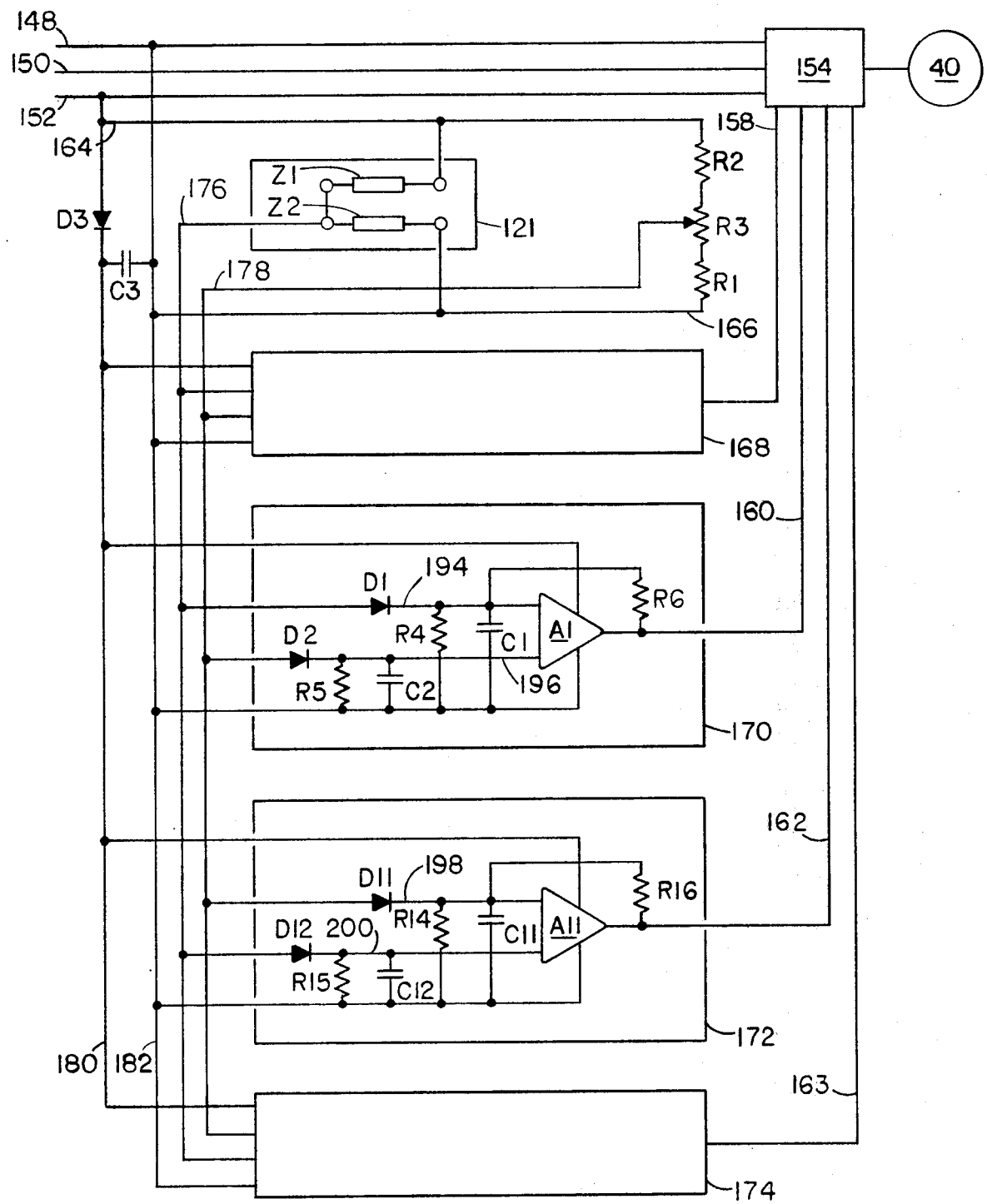
FIG. 1 illustrates a detection circuit usable with the alignment detection sensors for controlling an irrigation apparatus.

A variable reactance element forms a sensor or transducer which, when used with electrical circuitry which monitors the value of the variable reactance, can be utilized as part of an alignment system which will monitor the angular relationship between two members which are positionable at varying angles relative to one another. The invention may be utilized in a wide variety of alignment applications but the embodiments detailed illustrate the use of the invention in a particularly advantageous environment; namely, use in a mobile irrigation apparatus. Such an irrigation device is illustrated in U.S. Pat. No. 2,711,615, N. R. Boice, Jr. Alignment controls for such devices which include alignment sensors are illustrated in U.S. Pat. No. 3,823,730, J. W. Sandstrom et al., where photodetectors and potentiometers are utilized; U.S. Pat. No. 3,587,763, A. Kinkead, where lever actuated switches are used; and U.S. Pat. No. 4,034,778, D. E. Sage et al., where strain gauges mounted on deflecting surfaces are used. The irrigation devices 20, like the device illustrated in FIG. 2 typically consist of a series of elongated articulating sections 22 which may consist of sections of distribution pipe linked by flexible couplings 23. Additional structural framework may be provided to give structural rigidity. The sections are independently driven in a substantially aligned arrangement over the surface area to be processed. Water 24 is dispensed through nozzles 26 distributed along the distribution pipes 22. Such systems are capable of irrigating large surface areas, such as an area one half mile or more in diameter, in a substantially unattended operation. In a typical configuration the irrigation device 20 is attached at one end to a fixed distribution terminal 28 and rotates about the terminal sweeping over a circular section of the ground 30 to be irrigated. Connection pipes 32 at the terminal pivot suitably to deliver water to the pivoting apparatus. Each section 22 has associated with it a drive assembly 34. The drive assembly includes a support structure 36 which is attached to the section 22 and supports it above the ground on one or more drive wheels 38. The drive wheels are directed to travel transversely to the length of the sections 22. A drive motor 40 connected to the drive wheels 38 is controlled from a control box 42 containing electrical circuitry and located on the support structure 36. The control box may be located remotely and connected electrically through wires to the controlled section. In operation, the drive for the section furthest from the terminal pivot 44 is allowed to run while each interior section; under the influence of its associated controls; speeds up, slows down, or more typically stops and starts to maintain a substantially aligned relationship with the next section further away from the terminal pivot 28 than it. Usually the control range is only a few degrees; for example a section would start operation when it is one degree out of alignment and behind, lagging, the next outboard section and stop when it is one degree out of alignment and ahead, leading, the other section; waiting until the outboard section which has further to travel catches up and passes it once more.

There are several different methods of pivotally linking the articulating sections, but three types are more popular than the others. The various embodiments of the invention illustrate modifications of the invention which are adapted for use with the three different types of pivotal connections. Although some embodiments are illustrated in use with a certain type of linkage, this does not indicate that its use is limited to use with that type of linkage only.

Figure 6:
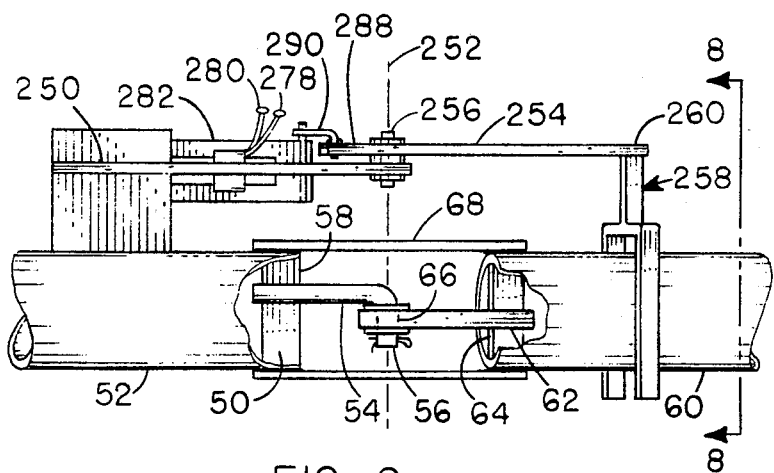
FIG. 6 is a side elevation view illustrating a mounting for the preferred embodiment of the alignment sensor on an irrigation apparatus having sections connected by internal type pivot connections.

One type of linking connection is the internal pivot system as illustrated in FIG. 6. In this connection a vertical bar 50 is attached to the interior of the pipe section 52. This bar 50 supports a rod 54 having a downturned end 56 which projects from the end 58 of the pipe 52. The adjacent pipe section 60 has an internally secured horizontal plate 62 which projects from the end 64 of the pipe section 60. The plate 62 contains a hole 66 which receives the downturned end 56 of the rod 54. The entire joint between the two pipes 52 and 60 is enclosed in a flexible watertight covering such as the rubber sleeve 68. By the use of such a pivotal connection the adjacent, articulating sections pivot about a point along the longitudinal axes of the pipes 52 and 60.

Figure 9:
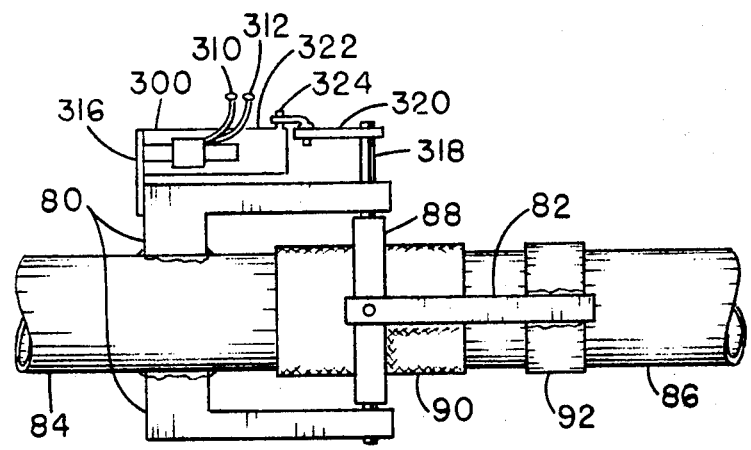
FIG. 9 is a side elevation view illustrating a mounting for the preferred embodiment of the alignment sensor on an irrigation apparatus having sections connected by universal type pivot connections.
Figure 10:
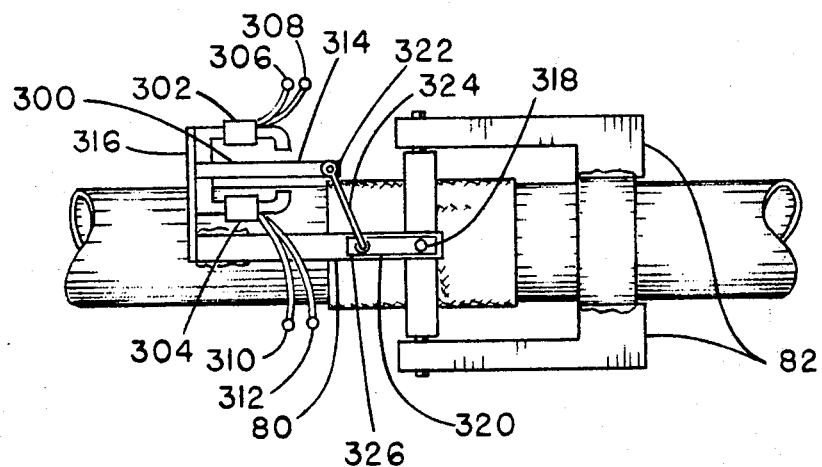
FIG. 10 is a top plan view of the mounting illustrated in FIG. 9.

A second pivotal connection system is a universal type connection illustrated generally in FIGS. 9 and 10. U.S. Pat. No. 3,738,687, Arthur L. Zimmerer et al. describes such connections. Yokes 80 and 82 are attached to the adjacent pipe sections 84 and 86 respectively. They each are pivotally connected to a floating link 88, which may be in the form of a ring or collar about the flexible, watertight sleeve 90 between the two pipes 84 and 86. The yokes are connected to the floating link along normal axes so that a universal joint is formed. One yoke, such as 82 may be attached to the pipe section 86 by a collar 92 to allow for rotating movement of the pipes 84 and 86 relative to one another. In such a connection system the pipes can pivot relative to one another about a point along their longitudinal axes like the previously described connection.

Figure 2:
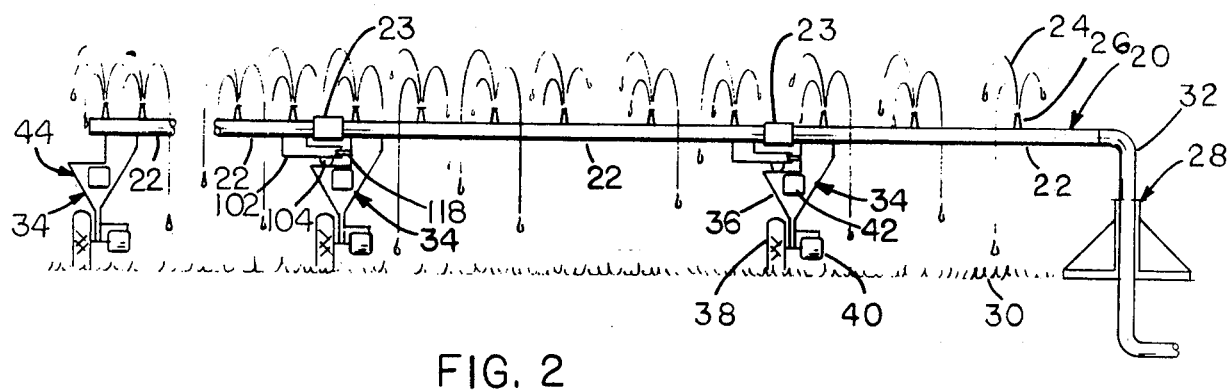
FIG. 2 is a side elevation view of a representative irrigation apparatus having articulating, independently driven sections and having sections connected by external pivot type connections.
Figure 3:
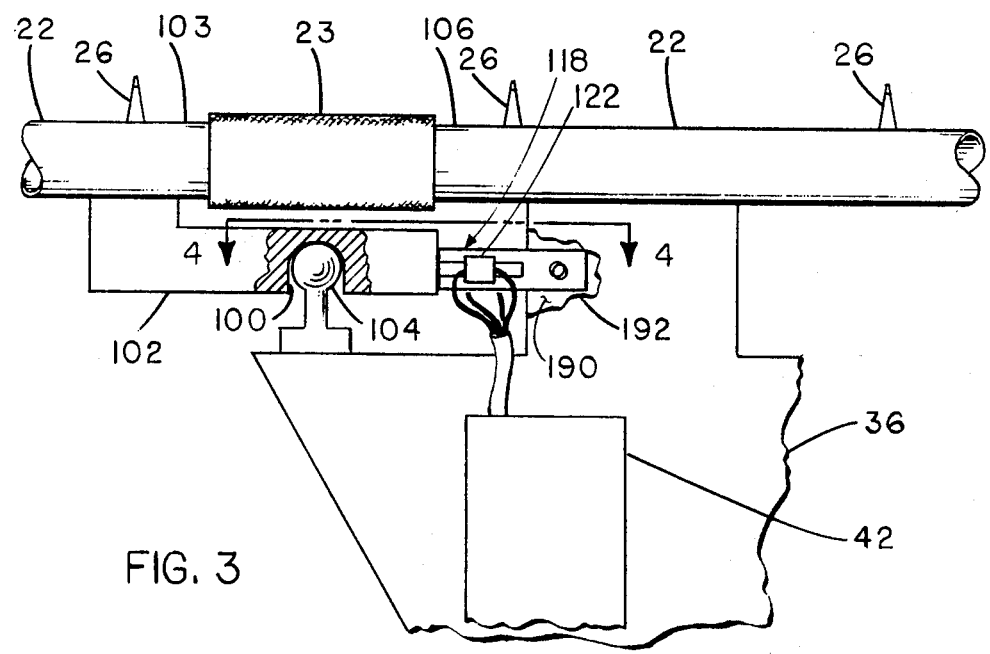
FIG. 3 is an enlarged side elevation view of the connection between two of the sections shown in FIG. 2 illustrating the preferred embodiment of the alignment sensor with parts broken away to show details.

In a third pivotal connection, as illustrated in FIGS. 2 and 3, which will be referred to as the external pivot system, the pipe sections 22 pivot about a point external to the pipes. In a typical arrangement a socket 100 in a support leg 102 connected to the end 103 of one section 22 mates with a ball 104 attached such as through the support structure 36 to the adjacent end 106 of the adjacent pipe section 22. The pipe sections 22 then pivot relative to one another about the ball and socket connection.

DESCRIPTION OF THE PREFERRED EMBODIMENT

A preferred form of the invention is illustrated in FIGS. 1, 2, 3, 4, 5, 7, 9 and 10.

For External Pivot Type Connections

Figure 4:
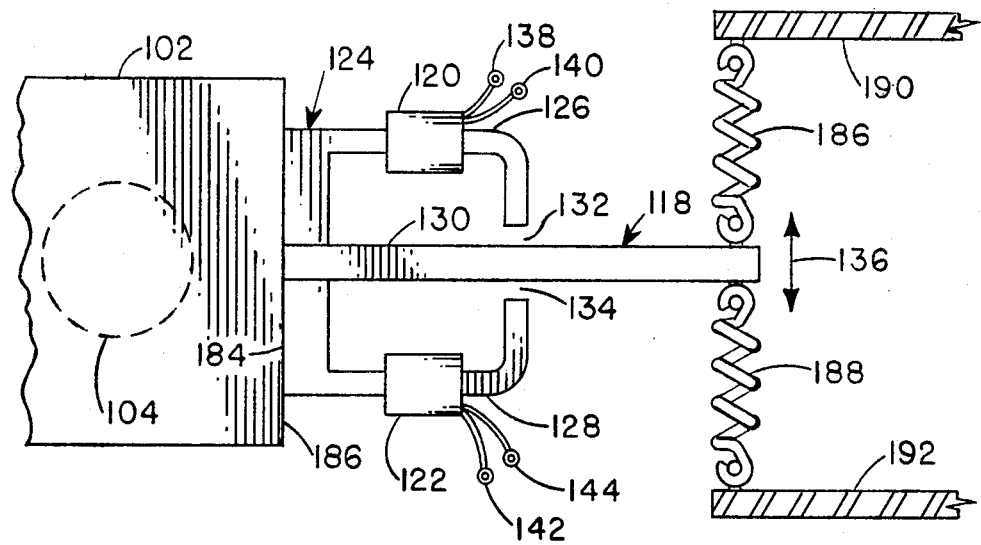
FIG. 4 is a top section view on the line 4—4 in FIG. 3.
Figure 5:
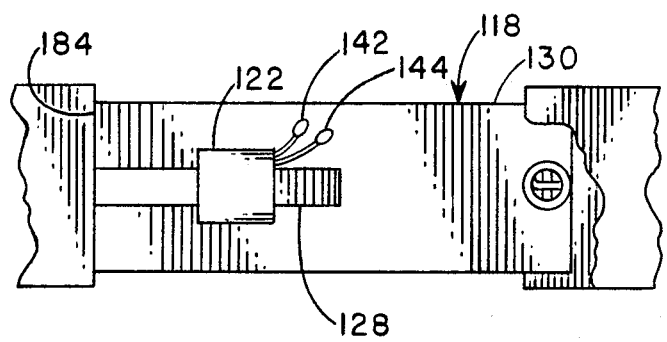
FIG. 5 is a side elevation of the embodiment shown in FIG. 4 with parts broken away.

Referring to FIGS. 1 to 5, the invention is illustrated as used with an external pivot type connection on a mobile irrigation device. The variable reactance element 118 as illustrated in FIG. 4 consists of a pair of inductive coils 120 and 122 mounted on a core element generally designated by the numeral 124. In its preferred form the core element consists of side elements 126 and 128, preferably of steel, on which the coils 120 and 122 respectively, are mounted. An integral central element of the core 130 is formed such as by rigidly securing, such as by welding, a bar between side elements 126 and 128. The core could be of a single piece construction if desired. The side elements 126 and 128 each form with the central element a flux path for their respective coils 120 and 122 which includes air gaps 132 and 134 respectively. The central element 130 is deflectable sideways as shown by the arrow 136. The degree of deflectability may be selected to suit the application such as by variation of the central member's cross section or selection of an appropriate core material. When the central member is deflected relative to the side elements 126 and 128 the air gaps 132 and 134 vary oppositely in size to vary the inductance of the coils 120 and 122 that appear between their respective terminals pairs 138 and 140 and 142 and 144.

The inductance of the coils 120 and 122 may be monitored by any of a wide variety of electrical circuitry. A preferred circuit is illustrated in FIG. 1. The conductors 148, 150, and 152 represent the conventional incoming power supply, in this example three phase AC power. The power is supplied to a conventional motor control 154 which applies the power to the section drive such as motor 40 in accordance with control signal inputs supplied on connections 158, 160, 162, and 163. An AC voltage is applied on connections 164 and 166 to a bridge network formed with the impedances Z1 and Z2 in two legs of the bridge along with fixed resistors R1 and R2 and variable resistor R3. The impedances 121 represent those impedances whose values are being monitored such as coils 120 and 122. Where only one impedance monitored will vary the other impedance is a fixed or dummy impedance. The variable resistor R3 provides the ability to balance the network. Sensing circuits 168, 170, 172 and 174 are connected through connections 176 and 178 to the bridge network. By these connections each sensing circuit monitors the AC voltage appearing across the bridge. The operation of each sensing circuit is similar. Referring to sensing circuit 170 as a representative example, the sensor monitors the voltage across the bridge through the comparator A1. Diodes D1 and D2 along with capacitors C1 and C2 rectify and filter the AC inputs. The resistors R4 and R5 are bleeder resistors provided to prevent the capacitors C1 and C2, respectively from remaining charged by the rectified input. Resistor R6 is a feedback resistor used for its conventional purpose. The diode D3 and capacitor C3 provide a source of DC power for the sensing circuits on conductors 180 and 182. Each sensing circuit may have separate sets of resistors like R1, R2 and R3. In such an arrangement there would be four bridge networks all with one half the bridge, that which contains Z1 and Z2, in common. This would allow individual adjustments for each sensing circuit.

The operation will be illustrated in connection with an irrigation system of the type having an external pivot connection between sections. The electrical operation for other embodiments will be analogous. As illustrated in FIG. 4 the base 184 of the variable reactance element 118 is rigidly secured, in any convenient manner to one section 22, such as by securement to the end 186 of the support leg 102. The central element 130 is biased; such as by coil springs 186 and 188 connected to support structure walls 190 and 192 which move with the driven section, so that misalignment in the sections cause the central member 130 to be stressed and deflected. The reactance element may be turned end for end; i.e. have its base secured to the driven section and the central member connected to the next outboard section. The amount of deflection and direction corresponds to the direction and amount of misalignment of the sections. This deflection in turn varies the size of the air gaps 132 and 134 to vary the inductance of the coils 120 and 122. The direction and amount of misalignment then can be detected by determining the value of the voltage between the inputs 194 and 196 to the comparator A1. By conventional selection of the circuit parameters the comparator A1 will operate with selected hysteresis, turn on, and turn off points to produce signals at its output connection 160 so that a signal, such as the presence or absence of voltage on connection 160 applied to the motor controller 154, causes the section drive to operate and maintain the desired alignment. For example, the comparator can be adjusted to turn on when the driven section lags the outboard section by two degrees and start the drive motor and then turn off when the driven section with the shorter distance to travel catches up with the outboard section and leads it by two degrees. The hysteresis of the comparator would be adjusted so as not to start the drive until the section again lagged by two degrees. Other circuitry may be utilized to perform the same function but this illustrated circuitry is preferred. This type of control operation is more fully described in U.S. Pat. No. 4,034,778, D. E. Sage, et al.

A second sensing circuit 172 is preferably provided, as shown in FIG. 1 which has circuit components D11, D12, D14, R15, R16, C11, C12 and A11 which correspond to the components in sensing circuit 170 and perform similarly. The difference in this circuit from the sensing circuit 170 lies in the reversal of the input connections 198 and 200 to connections 176 and 178 from 194 and 196 respectively. This sensing circuit serves to control the system when the irrigation system is rotated about the terminal in the opposite direction and thus the lag and lead relationship of the adjacent sections are changed.

Preferably additional sensing circuits 168 and 174 are also provided. Their circuitry, not detailed, preferably corresponds to that of 170 and 174 respectively with their respective parameter values selected to provide signals on connections 158 and 163 respectively to the motor controller or other operation interruption device to stop the drive operation when excessive misalignment occurs. This may occur, for example, through the failure of a primary sensing circuit 170 or 172 or due to loss of drive wheel traction.

The variable reactance can be operated with only one active coil utilized, but two are preferred because when the two coils are used together in a bridge network a more sensitive movement detection results. Also effects, such as temperature effects on the coils, which uniformly alter the impedance of the coils balance out in the bridge network.

The relative movements of the sections could be equally well detected if the variable reactance mounting were reversed as by attaching it to the support structure 36 and linking the central member 118 to the support leg 102.

For Internal Pivot Type Connection

Figure 7:
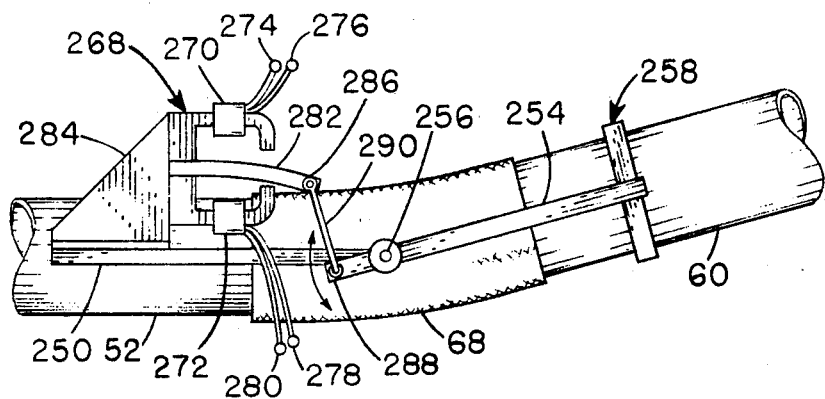
FIG. 7 is a top plan view of the mounting illustrated in FIG. 6 with the pipe sections shown out of alignment.
Figure 8:
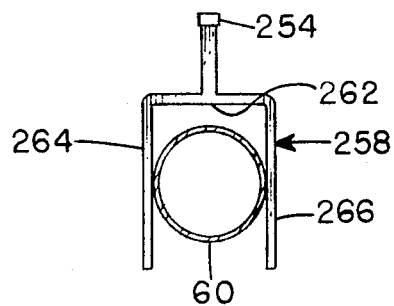
FIG. 8 is a section on the line 8—8 in FIG. 6.

FIGS. 6, 7 and 8 illustrate the use of the above described variable inductance with an irrigation system of the type having internal pivot type connections between adjacent sections. Electrically the system functions as described above. Because of the differences in the structure of the section connections a different mounting for the variable reactance from that described above is preferred. Referring to FIG. 6, a support arm 250 is rigidly attached to one of the articulating sections 52 and extends beyond the vertical axis 252 about which the sections 52 and 60 articulate. A sensor arm 254 is pivotally secured, such as by pin 256, on the axis 252 for rotation in a horizontal plane. Washers may be provided at the connection to promote easy rotation. The support arm 250 supports the sensor arm in the horizontal plane. A position detection arm, such as the fork 258, is attached to the end 260 of the sensor arm. The cross bar 262 of the fork 258 supports the spaced tines 264 and 266 which straddle the adjacent pipe section 60. Preferably the tines are spaced slightly farther apart than the outside diameter of the pipe 60. The cross bar 262 should be high enough above the top of pipe 62 so that in normal operation it will not contact the pipe. This mechanism operates so that the sensor arm 254 moves relative to the support arm 250 and pipe 52 with the horizontal movements of pipe section 60. Any relative movement of the pipe sections 52 and 60 in the vertical direction or relative rotation about their longitudinal axes do not affect the relative positions of the sensor and support arms. Referring to FIG. 7, the variable inductance element 268 is like that described above having coils 270 and 272 with connections 274 and 276, and 278 and 280 respectively and a deflectable central element 282, shown in an exaggerated condition. The variable inductance 268 is attached in a fixed position relative to the pipe section 52 such as by support plate 284 connected to the side of the support arm at a height approximately the same as the sensor arm 254. The central member 282 of the variable inductance is connected to the sensor arm 254, preferably at their respective ends 286 and 288 by link 290, so that movement of the sensor arm causes changes in the inductance of the coils 270 and 272. As with the previous embodiment the relative movements of the sections could be equally well detected if the variable reactance mounting were reversed as by attaching it to the sensor arm and linking the central member to section 52. The reactance of the coils can be monitored as describe above.

For Universal Type Pivot Connection

FIGS. 9 and 10 illustrate the use of the above described variable inductance with an irrigation system of the type having universal type pivot connections between adjacent sections. Electrically the system functions as described above. Because of the differences in the structure of the section connections a different mounting from those described above is preferred. It is preferred that when this form of variable reactance element is utilized that it be utilized in combination with an irrigation mechanism having the universal type pivot connections. The variable inductance 300, like those described above, has coils 302 and 304 with connections 306, 308 and 310, 312 respectively and central member 314. The reactance of the coils can be monitored as described above. The inductance 300 is mounted in a fixed position relative to the pipe section 84 such as by attachment by mounting plate 316 to the yoke 80. The central member is linked to the floating link 88 in order to detect its rotational movement about the vertical pivot pin 318 which connects the yoke 80 to the floating link 88. The pivot pin 318 is fixed to the floating link 88 and pivotally connected to the yoke 80. Preferably this linking is accomplished by the attachment of a lever arm, such as the stinger 320 to the pin 318 and connection of the end 322 of the central member 314 by link 324 to the end 326 of the stinger so that only the relative movements of the pipes 84 and 86 in a horizontal plane are detected. The relative movements of the pipes in a vertical plane do not change the inductances of the coils 302 and 304. This is because such movements do not move the floating link relative to pipe section 84. As with the other embodiments the relative movements of the sections could be equally well detected if the mounting were reversed as by attachment of the variable inductance to the stinger and linking the central member to pipe section 84.

DESCRIPTION OF A SECOND EMBODIMENT

Figure 11:
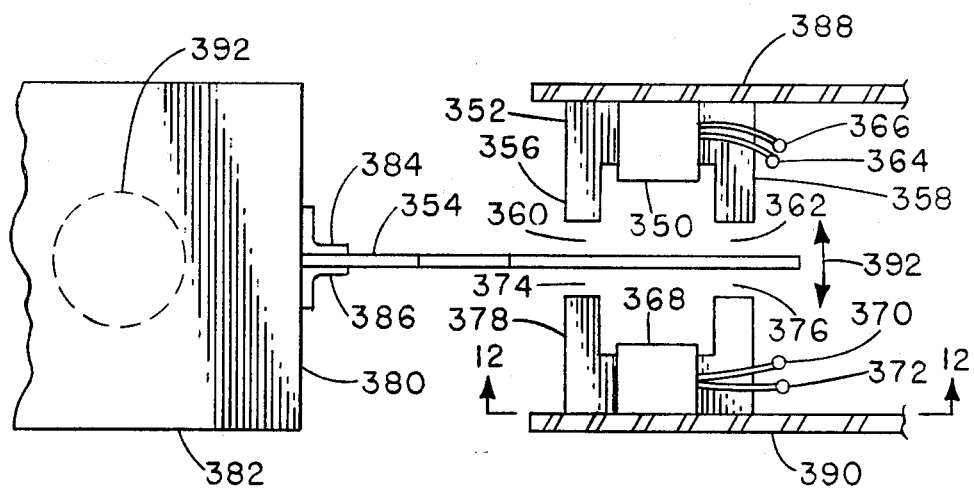
FIG. 11 is a top plan view illustrating a mounting for a second embodiment of the alignment sensor on an irrigation apparatus having sections connected by external pivot type connections.
Figure 12:
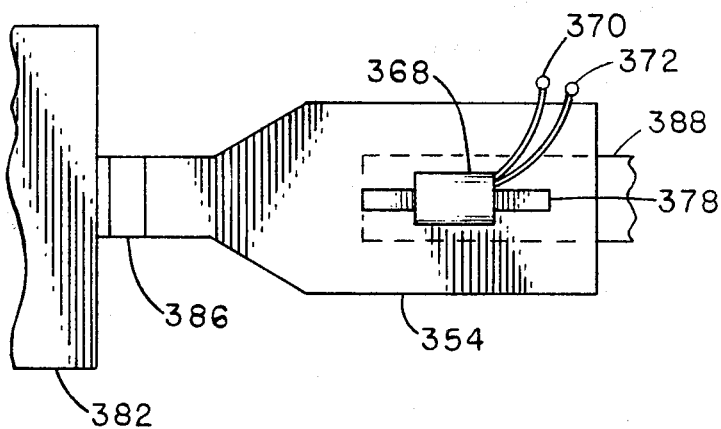
FIG. 12 is a section on the line 12—12 in FIG. 11.

Another embodiment of the variable reactance element is illustrated in FIGS. 11 and 12. It consists of a coil 350 with a core element which form a partially complete flux path, preferably in the form of the C shaped element 352 illustrated. A second core element such as the plate 354 is spaced from the end 356 and 358 of the element 352 to form a complete flux path for the coil which contains air gaps 360 and 362. Preferably the plate is relatively thin, for example one eighth inch thick or less so that in case of a control system failure the plate will bend rather than destroy other components of the control. The size of the air gaps 360 and 362 depends on the relative spacing of the core elements 352 and 354. The size of the air gaps affect the inductance of the coil 350 as seen at its terminals 364 and 366. Preferably there is a second coil 368 having terminals 370 and 372 and similarly constructed and positioned opposite to the plate 354 from the first one. The plate completes the flux path for coil 368 which includes air gaps 374 and 376. Using such a configuration the inductances of the coils will vary oppositely to each other as the position of the plate between the core elements 352 and 378 varies. Detection of the variations in the inductance of the coils can be accomplished in the manner described above for the previous embodiment of the variable reactance.

For External Pivot Type Connections

Referring to FIGS. 11 and 12 the mounting for an irrigation mechanism of the external type similar to that illustrated in FIGS. 3 and 4 is illustrated. The plate 354 is attached to the end 380 of the support leg 382, which is connected to one section of pipe, not detailed, such as by brackets 384 and 386. The coils 350 and 368 and their associated core elements are attached to the adjacent section, such as by attachment to the support structure walls 388 and 390 respectively, for movement with that section. As the sections articulate about the pivot 392 their relative movement in the horizontal plane causes the plate 354 to move relative to the coils as shown by the arrow 392 to vary the inductance of the coils. Preferably the plate has a vertical dimension in the area of the air gaps which is substantially larger than the core elements 352 and 378 so that relative movements of the sections in the vertical direction do not substantially effect the inductance of the coils. Preferably the plate 354 has the A shape illustrated in FIG. 12. The relative movements of the sections could be equally well detected if the mounting were reversed as by attachment of the coils to the support arm 382 and attachment of the plate to the adjacent sections by connection to the support structure walls.

For Internal Type Pivot Connection

Figure 13:
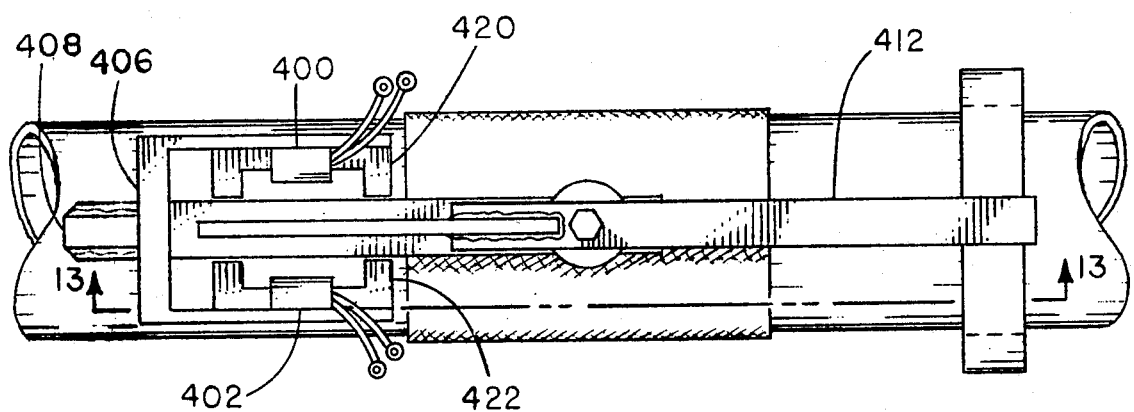
FIG. 13 is a top plan view illustrating a mounting for the second embodiment of the alignment sensor on an irrigation apparatus having sections connected by internal type pivot connections.
Figure 14:
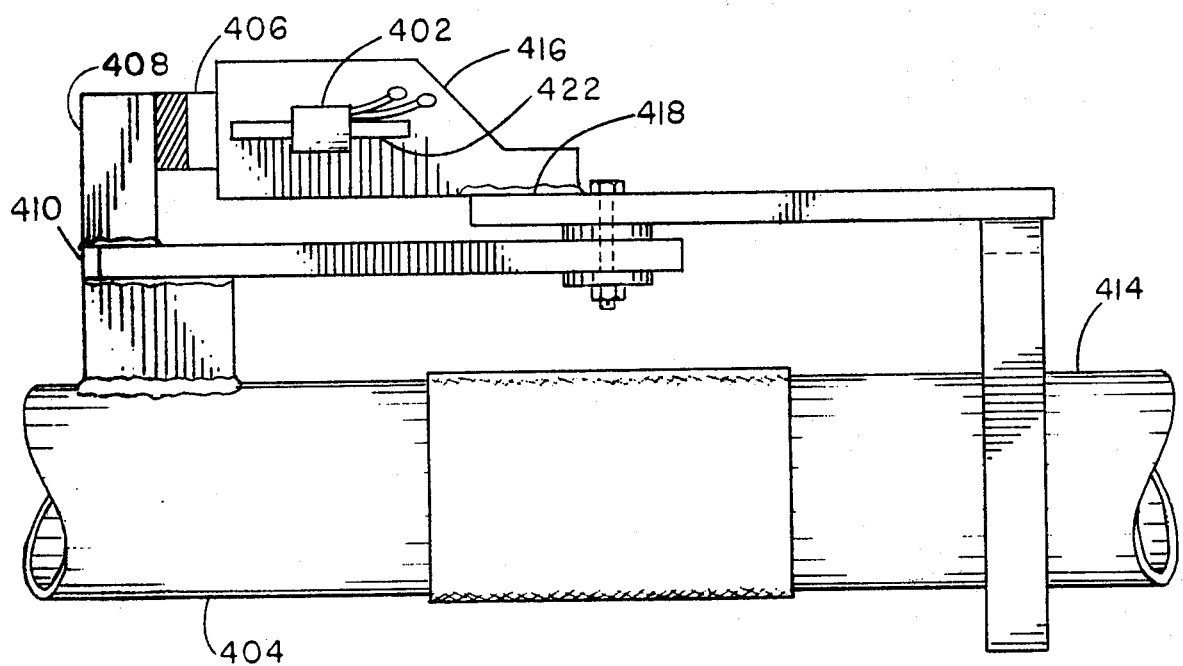
FIG. 14 is a section on the line 13—13 in FIG. 13.

FIGS. 13 and 14 illustrate the use of the above described variable inductance with an irrigation system of the type having internal type pivot connections between adjacent sections similar to that illustrated in FIGS. 6, 7 and 8. The coils 400 and 402 are secured in a fixed position relative to one section 404 such as by the use of mounting brackets 406 and 408 attached to the support arm 410. The support arm functions as described above with the sensor arm 412 which follows the movements of the adjacent section 414, also as described above. The plate 416 which extends between the coils is attached to the sensor arm, preferably at the end 418, to follow the movement of the section 414. Since there will be no vertical movement of the plate 416 relative to the coils the plate need not, but may be, dimensionally larger than the coil core elements 420 and 422 in the vertical dimension. As with the other embodiments the relative movements of the sections could be equally well detected by interchanging the position of the plate and coils.

For Universal Type Pivot Connection

Figure 15:
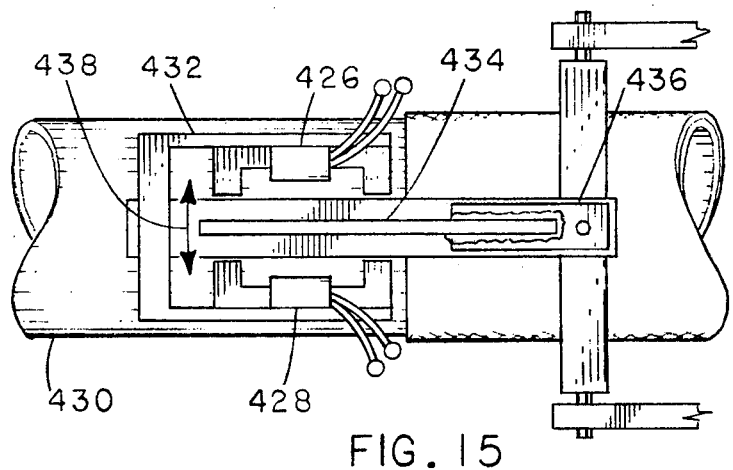
FIG. 15 is a top plan view illustrating a mounting for the second embodiment of the alignment sensor on an irrigation apparatus having sections connected by universal type pivot connections like that in FIGS. 9 and 10.

FIG. 15 illustrates the use of the above described variable inductance with an irrigation system of the type having universal type pivot connections similar to that illustrated in FIGS. 9 and 10. The coils 426 and 428 are mounted in a fixed position relative to the section 430 such as by the use of the bracket 432 which may be secured to the yoke associated with that section. The plate 434 is connected for movement with the floating link such as by attachment to the end of the stinger 436. The stinger moves as described above for the embodiment shown in FIGS. 9 and 10. The plate 434 thus moves, as shown by the arrow 438 relative to the coils to vary the coil inductances. The relative movements of the sections can also be detected if the positions of the plate and coils are interchanged. This particular configuration is preferred where this form of variable inductance is utilized.

Description of A Third Embodiment

Figure 16:
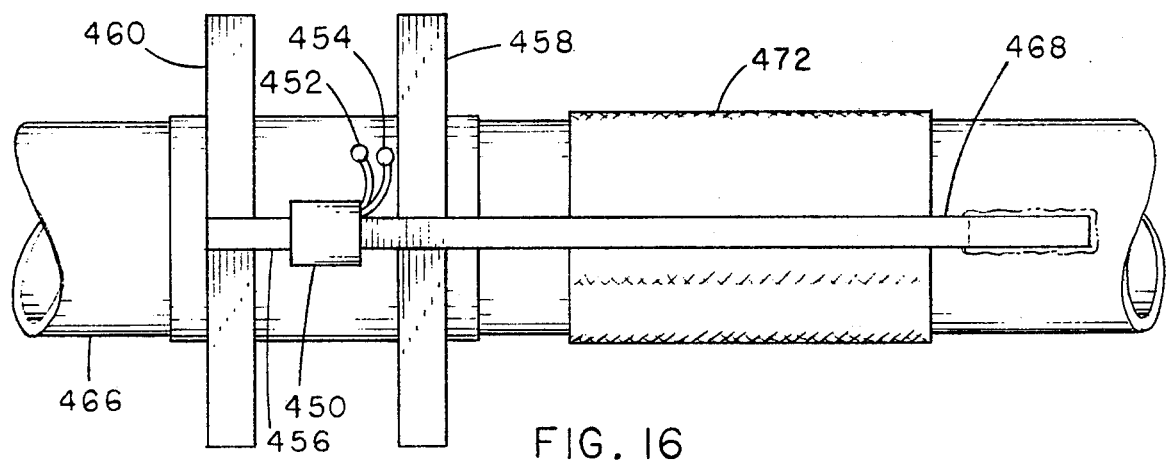
FIG. 16 is a side elevation view illustrating a third embodiment of the alignment sensor.
Figure 17:
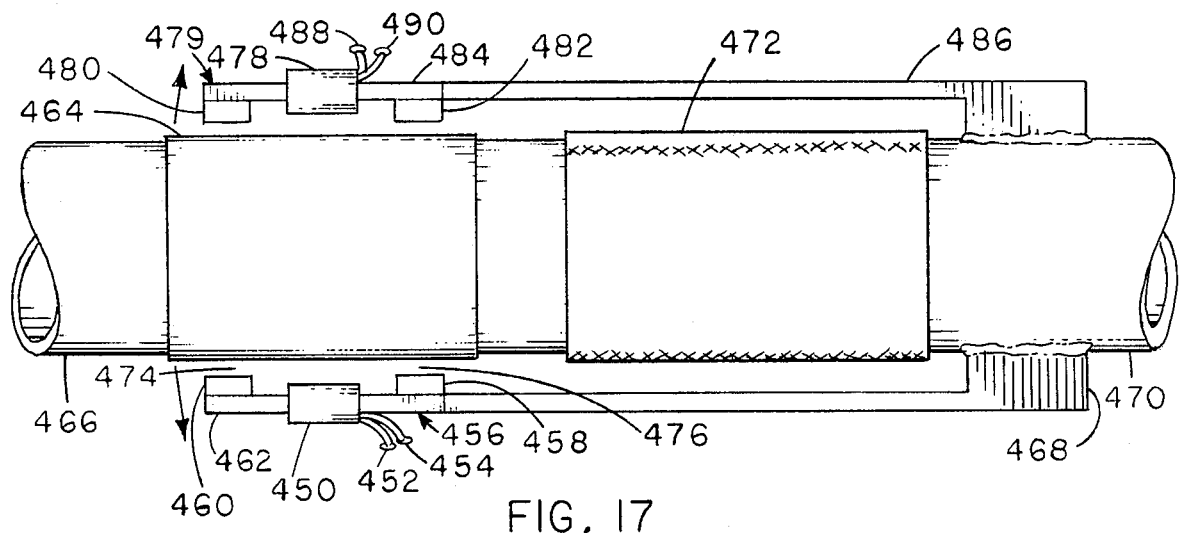
FIG. 17 is a top plan view of the embodiment shown in FIG. 16.

A third embodiment of the variable reactance element is illustrated in FIGS. 16 and 17. This embodiment functions electrically much like the previously described embodiment. It is illustrated in connection with an irrigation mechanism of the type having an internal type pivot connections between adjacent sections. It can be utilized equally well with other types of pivot connection arrangements. A coil 450 having connections 452 and 454 is mounted on a core element 456 which is fixed in position relative to the coil and forms a partially complete flux path for the coil much like the C shaped core element described above. The core has two elongated sections on either side of the coil 450, preferably in the form of the vertically aligned bars 458 and 460. The bars are connected by the horizontal bar 462 on which the coil is mounted. These components of the core 456 may be constructed of separate members secured together or made in one piece. Like the previously described variable inductance a second core element is provided which when placed adjacent to the first forms a complete flux path for the coil 450. Preferably this second core element is formed by a band 464 of steel or other flux conductive material attached to one pipe section 466. Where the pipe is of steel or a similar material the pipe itself can serve as the second core element as shown in FIG. 16. The coil 450 and core 456 are linked, such as by magnetically insulating support member 468, to the adjacent pipe section 470 on the other side of the flexible connection 472 for movement with that section. Relative movement of the pipe sections in a direction, in this case a horizontal direction, normal to the bars 458 and 460 alters the size of the air gaps 474 and 476 to vary the inductance of the coil 450. This permits the electrical detection of the alignment of the sections through the monitoring of the impedance of the coil. In order to minimize the effect of vertical movement of the sections the bars 458 and 460 should have a substantially greater vertical dimension than the flux path completing core elemene, such as the pipe 466 or band 464. The bars should project both above and below this element. Preferably there is an identical coil 478 with corresponding core 479 with components such as the vertical bars 480 and 482 and horizontal bar 484. This variable inductance element is attached for movement with section 470, such as by the support member 486, so that the impedance of the coil 478 as viewed between its terminals 488 and 490 varies oppositely to that of coil 450. This is accomplished by placement of this variable inductance element on the opposite side of the section from the one first described. The inductance variations can be monitored in the manner and with the circuitry described above.

Description of a Fourth Embodiment

Figure 18:
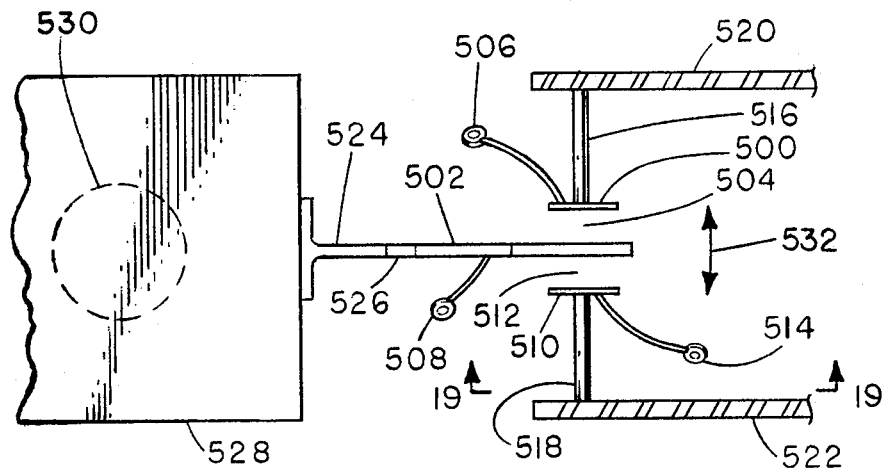
FIG. 18 is a top plan view illustrating a mounting for a fourth embodiment of the alignment sensor on an irrigation apparatus having sections connected by external pivot type connections.
Figure 19:
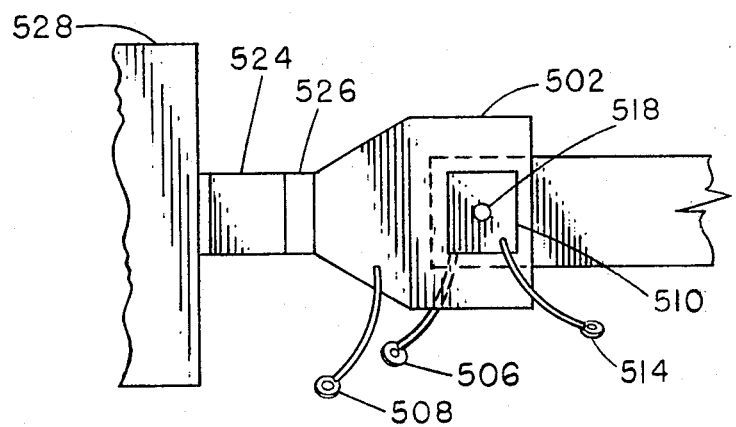
FIG. 19 is a section on the line 19—19 in FIG. 18.

FIGS. 18, 19, 20, 21, 22 and 23 indicate a fourth embodiment of the variable reactance. It consists, as shown in FIGS. 18 and 19 of a conductive element, such as the plate 500 in juxtaposition with another conductive element such as the plate 502. The elements are separated by a space such as the air gap 504. The impedance of the capacitor thus formed will depend on the spacing of the plates when viewed at their terminals 506 and 508 respectively. Preferably a third conductive element such as the conductive plate 510 defining a space such as air gap 512 is also provided. This forms a second capacitor having a variable impedance when viewed at terminals 508 and 514. The second capacitor will vary oppositely in value to the first capacitor when the plates 510 and 500 are held fixed relative to one another and the plate 502 moved between them to alter the size of the air gaps 504 and 512 oppositely. Detection of the variations of the impedance of the capacitors can be accomplished in the manner described above with the capacitors in the position of Z1 and Z2 in the detection circuitry previously described.

For External Pivot Type Connections

FIGS. 18 and 19 illustrate the mounting of this embodiment for an irrigation mechanism of the external pivot type, similar to that illustrated in FIGS. 3 and 4. The plates 500 and 510 are attached to one pipe section for movement with that section, such as by attachment by insulating supports 516 and 518 respectively to the support structure walls 520 and 522 respectively. The plate 502 is secured to the adjacent pipe section for movement with that section such as by bracket 524 with insulating connector 526 attached to the support leg 528 which is connected to the pipe section. As the pipes move horizontally about pivot 530 the plate 502 moves relative to the other plates 500 and 510 as shown by the arrow 532. Preferably the plate 502 is larger than the other plates 510 and 500 so that the capacitances will remain relatively insensitive to vertical movement of the pipe sections relative to one another. The opposite size relationship can also be utilized for the same purpose. As with the previously described embodiments the relative movements of the sections could also be detected where the plates 500 and 510 were attached to the support arm and the plate 502 attached to a support wall.

For Internal Pivot Type Connection

Figure 20:
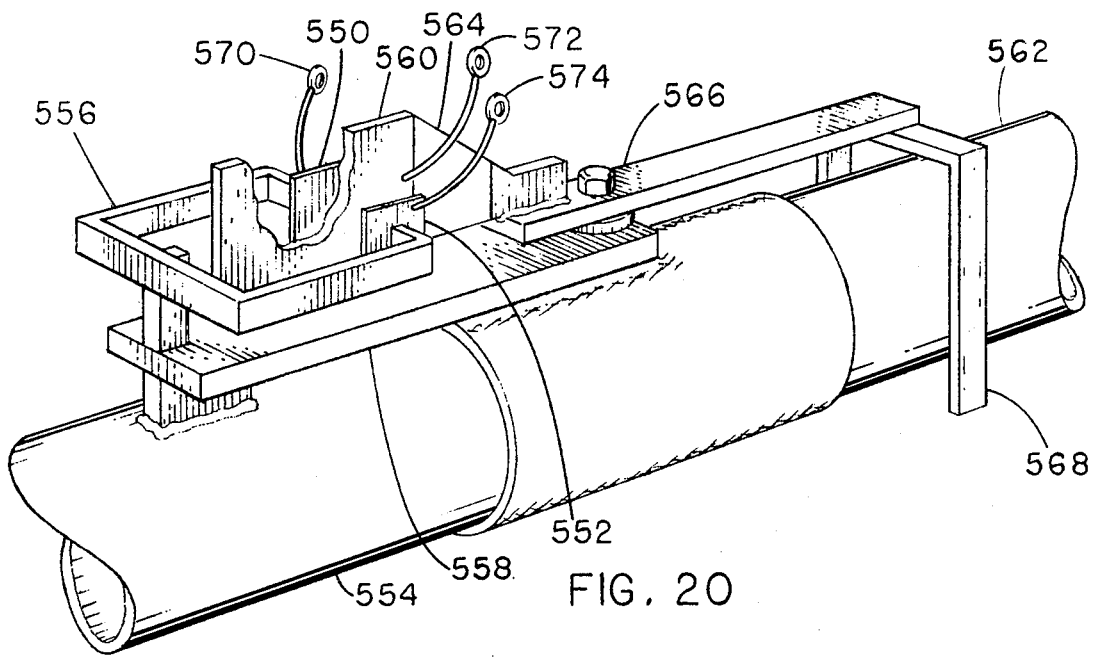
FIG. 20 is a perspective view illustrating a mounting for the fourth embodiment of the alignment sensor on an irrigation apparatus having sections connected by internal type pivot connections.

FIG. 20 illustrate the use of the variable capacitors described above with an irrigation system of the type having internal pivot type connections between sections like those shown in FIGS. 6, 7 and 8. Electrically the variable capacitors function as that described above. Plates 550 and 552 are attached to one pipe section, such as by the insulating support structure 556 attached to the support arm 558. Plate 560 is supported between plates 550 and 552 and is linked to the adjacent pipe section 562 for movement with that section such as by insulating arm 564 attached to the end of the sensor arm 566. The sensor arm 566, support arm 558, and position detection arm 568 function as previously described to move plate 560 between plates 550 and 552. This forms two oppositely variable capacitors when terminals 570, 572, and 574 are monitored. As before, the mounting of the plates to the sections can be reversed.

For a Universal Type Pivot Connection

Figure 21:
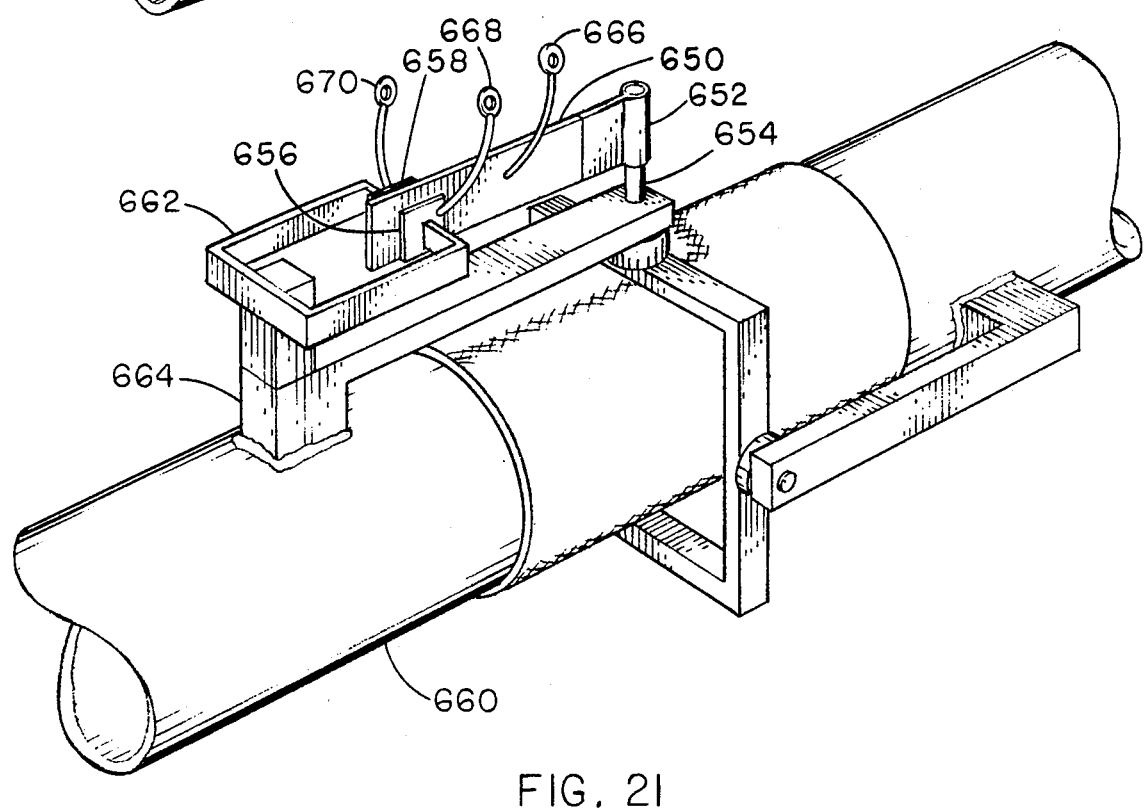
FIG. 21 is a perspective view illustrating a mounting for the fourth embodiment of the alignment sensor on an irrigation apparatus having sections connected by universal type pivot connections.

FIG. 21 illustrates the use of the variable capacitors described above with an irrigation system of the type having universal type pivot connections between adjacent sections like that described in FIGS. 9 and 10. Electrically the variable capacitors function as described above. A conductive plate 650 is mounted on an insulating stinger 652 connected to the pivot pin 654, which moves with one section of pipe as described above. Two conductive plates 656 and 658 are connected to the other pipe section 660 for movement with that section, such as by support bracket 662 and support 664. The horizontal movement of the sections are detected as variations in the capacitances formed by the plates and monitored on connections 666, 668 and 670 in the same manner as the two previously described variable capacitor pairs. As in the above embodiments the plates 656 and 658 could be mounted on the stinger 652 with bracket 662 and the plate 650 secured to section 660 with the plates 656 and 658 on either side.

Description of a Fifth Embodiment

Figure 22:
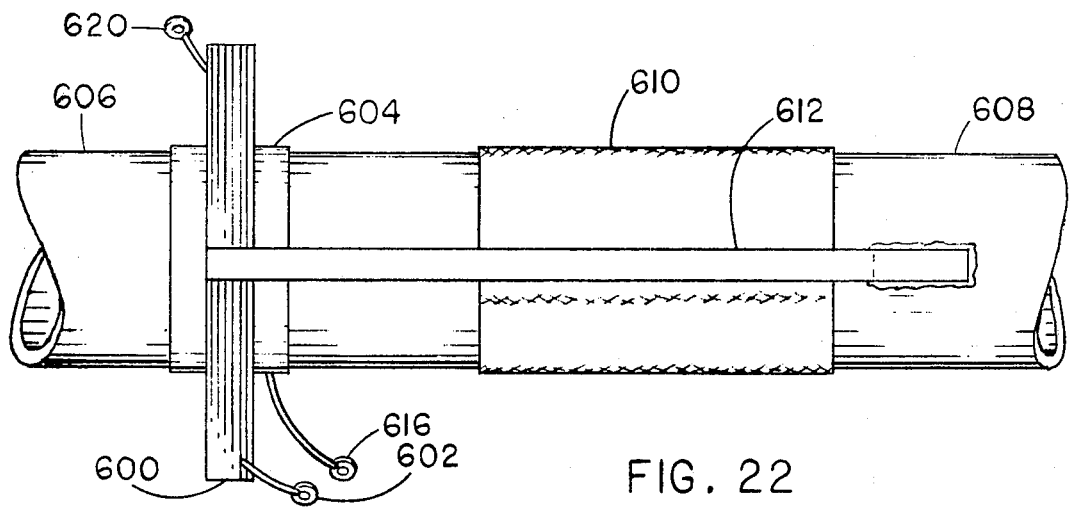
FIG. 22 is a side elevation view illustrating a fifth embodiment of the alignment sensor.
Figure 23:
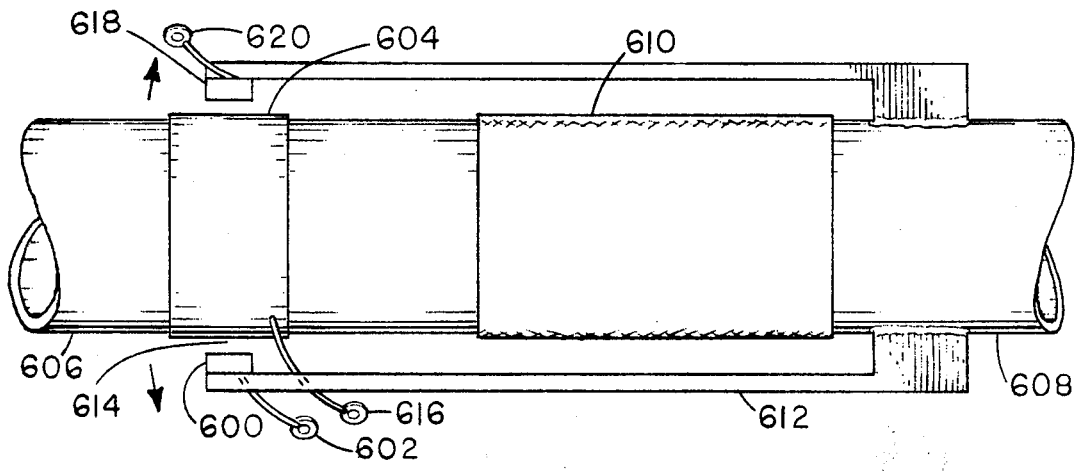
FIG. 23 is a top plan view of the embodiment shown in FIG. 22.

A variable reactance alignment detector having a physical appearance similar to the third embodiment shown in FIGS. 16 and 17 but working on capacitance principles is illustrated in FIGS. 22 and 23. It is illustrated in connection with an irrigation mechanism of the type having internal type pivot connections between sections. It can be utilized equally well with other types of pivot connection arrangements. An elongated conductive element, such as the vertically aligned bar 600 having connection terminal 602, is placed adjacent a second conductive element linked to a pipe section 606 for movement with that section, such as the conductive band 604 around the pipe 606. The pipe surface, if conductive, may serve in place of the band, but it is preferred that a separate conductive element such as the band be used and that it be insulated from the pipe surface if the pipe surface is conductive. The conductive bar 600 is attached to the other pipe section 608 on the other side of the flexible sleeve 610 such as by insulating support member 612. As the pipe sections 606 and 608 articulate relative to one another in the plane normal to the bar 600, in this case the horizontal plane, the air gap 614 between the conductive elements changes in size. This change can be detected on terminals 602 and 616 as a change in capacitance of the capacitor formed by the bar 600 and band 604. Preferably there is a similar elongated conductive bar 618 on the opposite side of the pipe 606 which forms a variable capacitor measurable between terminals 620 and 616. The capacitance will vary oppositely to that measured between terminals 616 and 602. Band 604 could be replaced by two separate conductive elements on opposite sides of the pipe, each forming a capacitor with a conductive bar. This separation is unnecessary where the variable capacitances formed will be tied together electrically anyway as in the preferred monitoring circuit shown and described above. The bars 600 and 618 are preferably substantially longer in the vertical dimension than the conductive band and pipe so that relative movements of the pipe sections in the vertical plane, only minimally effect the capacitance values.

Description of a Sixth Embodiment

Figure 24:
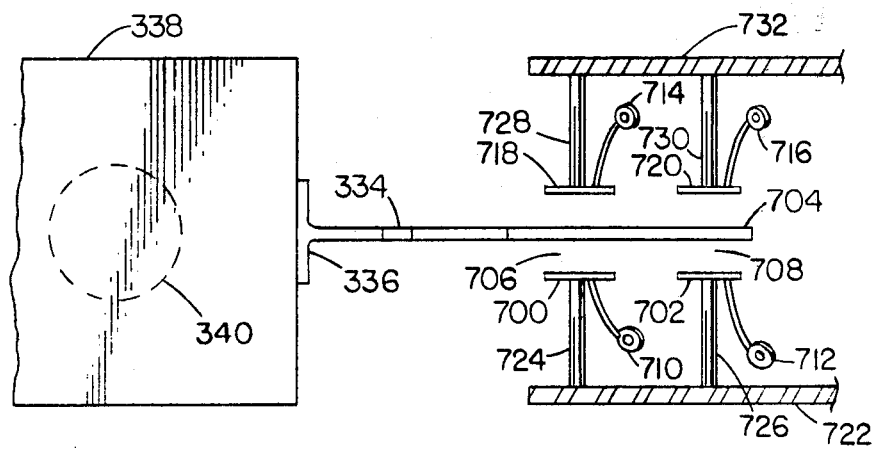
FIG. 24 is a top plan view illustrating a mounting for a sixth embodiment of the alignment sensor on an irrigation apparatus having sections connected by external pivot type connections which is structurally similar to the embodiment shown in FIG. 18 and 19.

A sixth embodiment of the variable reactance element alignment detector is illustrated in FIGS. 24, 25 and 26. This embodiment functions electrically much like the previous embodiment in that varlable capacitors are formed. It consists of a pair of spaced conductive elements such as the plates 700 and 702 which are in a fixed positional relationship to one another. Another conductive element such as the larger plate 704 is placed in juxtaposition with the plates 700 and 702 defining air gaps 706 and 708 respectively. If the spacing between plates 702 and 703 is relatively large as compared to the size of the air gaps 706 and 708 a variable capacitor having terminals 710 and 712 will be formed having a capacitance which depends on the size of the air gaps. The capacitance can be monitored with the circuitry described above with the capacitor in the position of impedances Z1 and Z2. Preferably there is a similarly formed variable capacitor having terminals 714 and 716 formed on the opposite side of plate 704 by conductive elements such as the plates 718 and 720. The capacitance of this variable capacitor will vary oppositely to the other one. The capacitors may be monitored in a circuit like that shown in FIG. 1 with each capacitor represented by Z1 and Z2 in a bridge network.

For External Pivot Type Connections

FIG. 24 illustrates the mounting of this embodiment for an irrigation mechanism of the external pivot type, similar to that illustrated in FIGS. 3 and 4. The plates 700 and 702 are attached to one pipe section for movement with that section, such as by connection to the support structure wall 722 by insulating supports 724 and 726. The plates 718 and 720 are similarly connected by insulating supports 728 and 730 to the support structure wall 732. The plate 704 which is preferably paddle shaped like the plate 354 shown in FIG. 12; and preferably has a much larger vertical dimension than the plates 700, 702, 718 and 720. It is connected to the other pipe section such as by insulating connector 334 and bracket 336 attached to the end of the support leg 338. As the pipe sections pivot about the ball and socket joint 340 in the horizontal plane the capacitances vary. Movements in the vertical plane do not effect the capacitance as significantly because of the relative size difference in plate 704 from the others. As with the other embodiments, the plates 700, 702, 718 and 720 can be attached to the support leg and the plate 704 attached to the support structure walls.

For Internal Pivot Type Connections

FIG. 25 illustrates the use of the variable capacitors described above with an irrigation system of the type having internal pivot type connections between sections like those shown in FIGS. 6, 7, 8, and 20. Electrically, the variable capacitors function as above. Plates 740 and 742 as well as 748 and 750 are connected to the pipe section 744 for movement with that section such as by insulating support bracket 746 which is connected to the pipe section. Plate 752 is linked to the pipe section 754 such as by insulating connector 756 and arm 758 connected to the sensor arm 760. The sensor arm 760 functions as described above. This forms two variable capacitors which can be monitored at terminals 762, 764 and 766, 768 respectively. It should be noted that the plates 740, 742, 748 and 750 can be attached for movement with the sensor arm 760 and the plate 752 fixed to the pipe section 744. Physically this embodiment is like that shown in FIG. 20 with the addition of one additional conductive plate on either side of the central plate.

For a Universal Type Pivot Connection

FIG. 26 illustrates the use of the variable capacitors described above with an irrigation system of the type having universal type pivot connections between sections like those shown in FIGS. 9, 10 and 21. Physically this embodiment is like that shown in FIG. 21 with the addition of one additional conductive plate on either side of the central plate. The central element, preferably in the form of a plate 770, is secured such as by insulating stinger 772 to the floating link for movement with the link. Conductive elements, such as plates 776 and 778 on supports 777 and 779 which form a variable capacitor monitorable on terminals 780 and 782. Another pair of plates on the opposite side of plate 770 form a second variable capacitor which is monitored on terminals 784 and 786. The pairs of plates on either side of plate 770 are secured to the pipe section having the vertically aligned yoke for movement with that section. The movement of the pipe sections in the horizontal plane causes detectable movement of plate 770 relative to the others as in the similar embodiments of FIGS. 9, 10 and 21. As with the other embodiments, the relative movement of the sections can be monitored if the physical attachment of the plate 770 and the other plates are reversed.

Description of a Seventh Embodiment

A variable reactance alignment detector having a physical appearance similar to the embodiment shown in FIGS. 22 and 23 but having an additional elongated bar on either side of the pipe section is illustrated in FIGS. 27 and 28. Electrically it functions on capacitance principles like the embodiments shown in FIGS. 24, 25 and 26. It is illustrated in connection with an irrigation mechanism of the type having internal type pivot connections between sections, but it can be utilized with other types of pivot connection arrangements. Elongated conductive elements such as the elongated vertical bars 800 and 802 having connections 804 and 806 are placed in juxtaposition with a conductive element, such as the conductive band 810. The air gaps 812 and 814 thus defined should be small when compared with the spacing of the bars 800 and 802. This will form a variable capacitor between the terminals 804 and 806. The band is preferaly insulated from the pipe 816 if the pipe is electrically conductive. The bars 800 and 802 are connected such as by insulating support member 818 to the adjacent pipe section 820 on the other side of the sleeve 822. Preferably there is a similar pair of bars 824 and 826 with terminals 828 and 830 respectively connected to the pipe section 820 as by insulating support member 832. This forms a second variable capacitor between terminals 828 and 830 whose capacitance may be monitored as in the previous embodiments and which varies oppositely to the capacitance at terminals 804 and 806. The bars are preferably substantially longer than the vertical dimension of the conductive band and pipe so that only relative movements of the pipes 816 and 820 in the horizontal plane significantly effect the magnitude of the capacitances.

Description of an Alternate Sensing System

Figure 29:
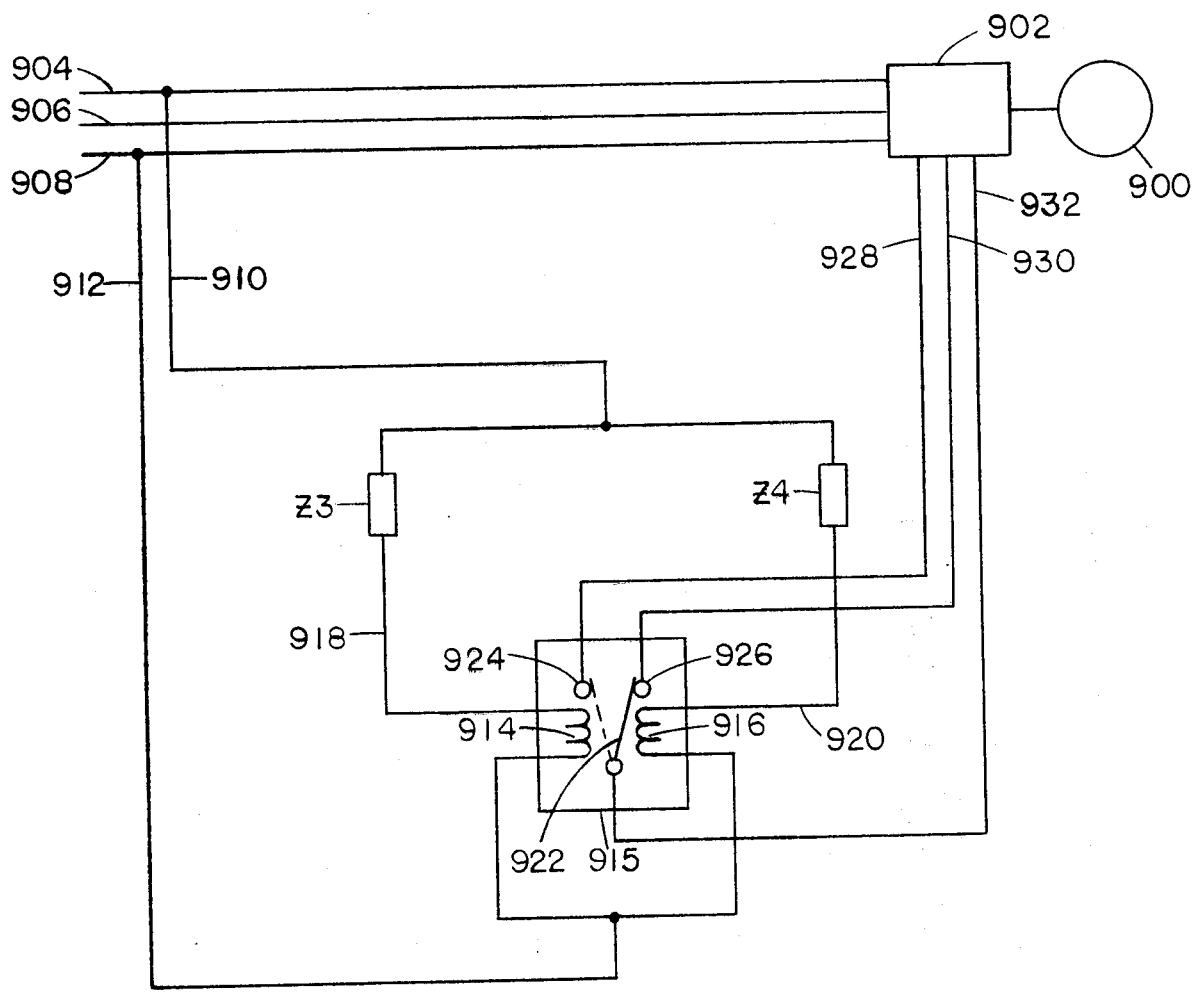
FIG. 29 illustrates another detection circuit usable with the alignment detection sensors for controlling an irrigation apparatus.

An alternate sensing circuit to that illustrated in FIG. 1 is illustrated in FIG. 29. The operation of the circuit is illustrated in connection with three phase AC power supplied on conductors 904, 906, and 908. The power is supplied to a conventional motor control 902 which supplies power to the section drive such as motor 900. The control 902 stops and starts the motor 900 depending on whether the relay contact 922 of the differential current relay 915 is in contact with terminal 924 or 926 as detected on connections 928, 930 and 932. The two coils 914 and 916 of the relay are connected in series with an impedance Z3 and Z4 respectively. AC is applied by connections 910 and 912 across the impedances and their associated coils. The impedances Z3 and Z4 perform as Z1 and Z2 in the previously described circuitry. When wed in connection with the embodiments of the variable reactances described above one variable reactance element is represented by Z3 and the corresponding but oppositely varying reactance element is represented by Z4. When the reactances vary as described above, the current in one relay coil increases relative to the other. This current different acts to move the relay contact 922 between terminals 924 and 926 depending on the relative magnitudes of the current. The relay 915 has a hysteresis associated with its operation. By such operation the circuit illustrated can be used to control the operation of an irrigation section drive to maintain alignment of the sections in the same manner as sensing circuit 170 of FIG. 1. It should be noted that the circuit illustrated only controls the operation in one direction as does sensing circuit 170. Similar circuits can be added as they were in the circuit of FIG. 1 to provide control for travel of the irrigation system in the opposite direction, alarms, or system shutdown where excessive misalignment occurs. This circuitry has the advantages of being very simple and inexpensive to construct.

We claim:

1. In a mobile irrigation apparatus of the type having an elongated fluid distribution means including a plurality of articulating sections, a drive means associated with one of said sections for propelling said one of said sections and an alignment control means associated with the drive means for maintaining a substantially, aligned relationship between the propelled section and an adjacent section, said alignment control means including a drive control means responsive to an input signal from said alignment control means indicative of the angular relationship between the propelled section and the adjacent section to maintain a predetermined angular relationship the improvement wherein the alignment control means comprises a variable inductance comprising at least one inductive coil, a core forming a closed loop flux path for the coil having only one air gap within the flux path, the core having a base element, a first lateral element connected to the base element, a second lateral element connected to the base element, said coil being mounted on one of said lateral elements, the second lateral element spaced from the first lateral element and having an end portion placed in close proximity to the first lateral element to define the air gap and the second lateral element having an intermediate portion between its end and its connection to the base element which is spaced more distantly from the first lateral element than its end portion, one of either of said lateral elements being deflectable with respect to each other in response to angular variation between said propelled and adjacent sections to vary the size of the air gap and hence vary the inductance, said alignment control means being mechaically linked to said respective propelled and adjacent sections.

2. In a mobile irrigation apparatus of the type having an elongated fluid distribution means including a plurality of articulating sections, a drive means associated with one of said sections for propelling said one of said sections and an alignment control means associated with the drive means for maintaining a substantially, aligned relationship between the propelled section and the adjacent section, said alignment control means including a drive control means responsive to an input signal from said alignment control means indicative of the angular relationship between the propelled section and the adjacent section to maintain a predetermined angular relationship, the improvement wherein the alignment control means comprises a variable inductance comprising a pair of inductance coils; a core forming a flux path for the coils having a central element, a pair of said elements which are positioned on opposite sides of the central element with each side element having one of the coils mounted thereon, and a base element joining the side elements to the central element so that the base element, side elements, and central element form a closed loop flux path for each of the coils with each path having only one air gap, said air gaps being formed on opposite sides of the central element between the central elements and the respective side elements and wherein the central element is deflectable with respect to the side elements in response to the angular variation between said propelled and adjacent sections to vary the size of the air gaps and hence vary the inductance, said alignment control means being mechanically linked to said respective propelled and adjacent sections.

3. In a mobile irrigation apparatus, as claimed in claim 2, wherein the side elements of the core each have a portion which is spaced laterally apart from the central element and each side element has an end opposite the base element which extends inwardly toward the central member to define the associated gap.

4. In a mobile irrigation apparatus, as claimed in claim 2, wherein the base element is rigidly connected to one articulating section and wherein the central element has an outer end opposite where it connects to the base element which extends beyond the side elements and is connected to the articulating section adjacent to that to which the base element is connected.

5. In a mobile irrigation apparatus, as claimed in claim 2, wherein the central element of the core comprises a single bar which forms a common flux path for both coils.

6. An alignment system for monitoring the angular relationship between two members having a variable angular relationship and for producing a signal indicative of the angular relationship, comprising:

a. a variable inductance element which is connected to each member so that its inductance varies with the variation of the angular relationship of the members including at least one inductive coil, a core forming a closed loop flux path for the coil having only one air gap within the flux path, the core having a base element, a first lateral element connected to the base element, a second lateral element connected to the base element, said coil being mounted on one of said lateral elements, the second lateral element spaced from the first lateral element and having an end portion placed in close proximity to the first lateral element to define the air gap and the second lateral element having an intermediate portion between its end and its connection to the base element which is spaced more distantly from the first lateral element than its end portion, one of either of said lateral elements being deflectable with respect to each other in response to angular variation between said members to vary the size of the air gap and hence vary the inductance;

b. means, connected to the variable inductance element, for electrically monitoring the variable inductance producing a signal indicative of the inductance value so that the signal is indicative of the angular relationship of the members.

7. An alignment system for monitoring the angular relationship between two members having a variable angular relationship and for producing a signal indicative of the angular relationship, comprising:

a. a variable inductance element which is connected to each member so that its inductance varies with the variation of the angular relationship of the members including a pair of inductance coils; a core forming a flux path for the coils having a central element, a pair of side elements which are positioned on opposite sides of the central element with each side element having one of the coils mounted thereon, and a base element joining the side elements to the central element so that the base element, side elements, and central element form a closed loop flux path for each of the coils with each path having only one air gap, said air gaps being formed on opposite sides of the central element between the central elements and the respective side elements and wherein the central element is deflectable with respect to the side elements in response to the angular variation between said members to vary the size of the air gaps and and hence vary the inductance;

b. means, connected to the variable inductance element, for electrically monitoring the variable inductance producing a signal indicative of the inductance value so that the signal is indicative of the angular relationship of the members.

8. An alignment system, as claimed in claim 7, wherein the side elements of the core each have a portion which is spaced laterally apart from the central element and each side element has an end opposite the base element which extends inwardly toward the central member to define the associated gap.

9. An alignment system, as claimed in claim 7, wherein the base element is rigidly connected to one member and wherein the central element has an outer end opposite where it connects to the base element which extends beyond the side elements and is connected to the other member.

10. An alignment system, as claimed in claim 7, wherein the central element of the core comprises a single bar which forms a common flux path for both coils.

* * * * *